United States Patent Office 3,262,707
Patented July 26, 1966

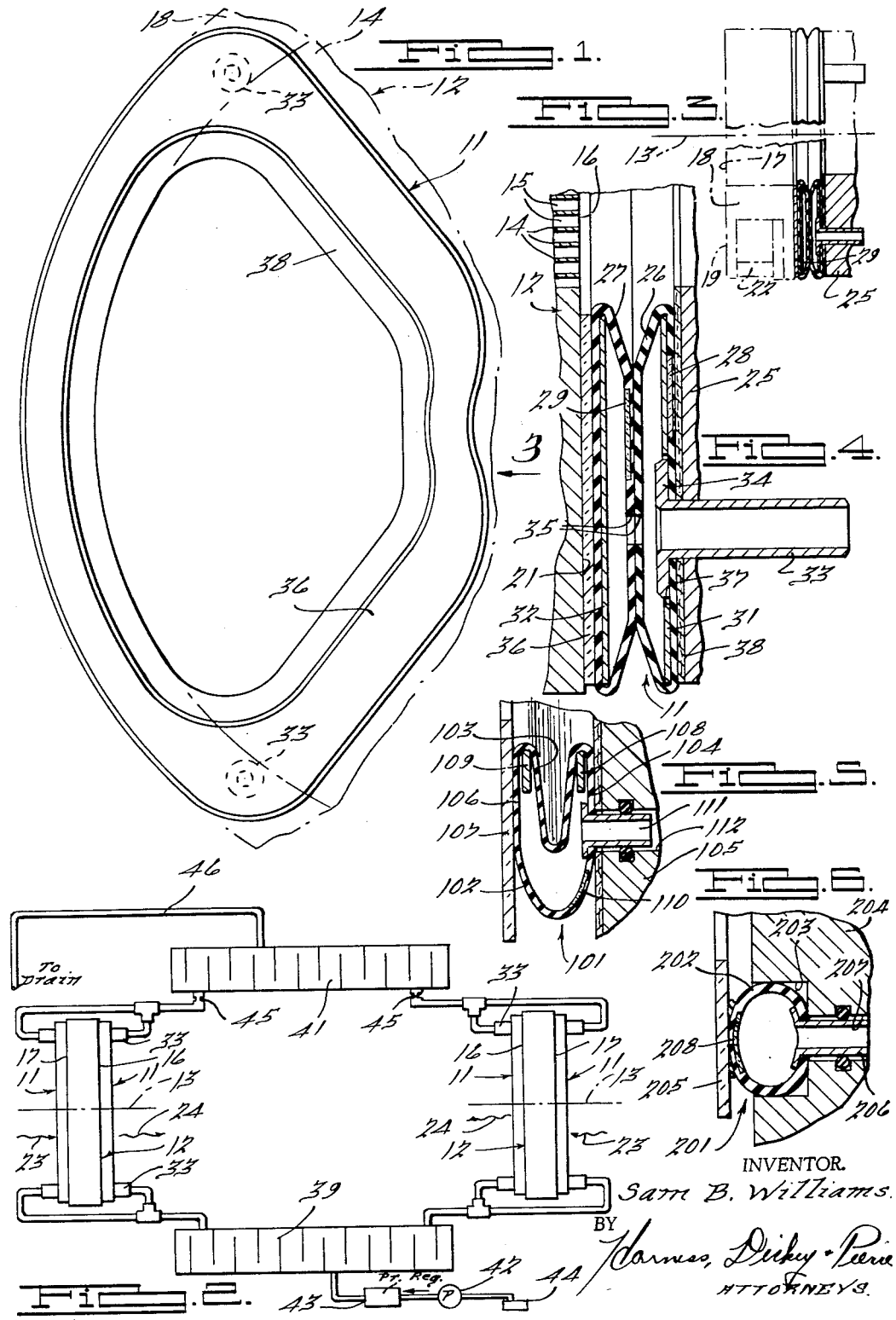

3,262,707
HIGH PRESSURE SEAL USED IN CONJUNCTION WITH REGENERATOR
Sam B. Williams, Walled Lake, Mich., assignor to Williams Research Corporation, Walled Lake, Mich., a corporation of Michigan
Filed Apr. 26, 1963, Ser. No. 275,926
7 Claims. (Cl. 277—34.3)

This invention relates to seals, and more particularly to high pressure seals used in conjunction with regenerators in gas turbines.

It is an object of the invention to provide a novel and improved high pressure seal which is especially adapted for environments in which high temperatures and great temperature fluctuations are involved, and which will maintain a high degree of sealing ability at all times.

It is another object to provide an improved high pressure seal construction of this type which permits the use of a rubberlike or similarly flexible material for the seal body, thus increasing the ability of the seal assembly to adapt itself to variations in the seal space which may occur due to distortion of the heated parts.

It is a further object to provide an improved seal construction having the above characteristics which has a relatively low manufacturing cost, is subject to a minimum of fatigue problems and will maintain its shape indefinitely under the effect of relatively high pressures.

Other objects, features, and advantages of the present invention will become apparent from the subsequent description, taken in conjunction with the accompanying drawings, in which:

FIGURE 1 is a side elevational view of a high pressure seal made in accordance with the principles of the present invention, the seal being adapted for use in conjunction with a rotating matrix type of regenerator for a gas turbine;

FIGURE 2 is a schematic view of a plurality of seals of the type shown in FIGURE 1, illustrating the pressurized coolant connections as well as their relationship to two matrices for a dual regenerator gas turbine;

FIGURE 3 is an end elevational view of the seal of FIGURE 1, taken in the direction of the arrow 3 of that figure, with parts being sectioned and broken away;

FIGURE 4 is an enlarged cross-sectional view of the lower portion of FIGURE 3 and showing the seal construction;

FIGURE 5 is a view similar to FIGURE 4 but showing a modified seal construction utilizing but a single tube; and FIGURE 6 is a view similar to FIGURES 4 and 5 but showing still another embodiment of the invention in which the internal sheet metal reinforcing members are replaced by a reinforcing recess in the gas turbine housing.

In general terms, each illustrated embodiment of the invention comprises a tube which is closed upon itself and which is made of a flexible material such as silicone rubber having heat-resistant properties in which is embedded spirally wound Fiberglas tape. The tube is adapted to be mounted in the stationary housing of a gas turbine adjacent either end surface of a cylindrically shaped rotatable regenerator matrix, and the shape of the closed tube is such as to enclose one of the segmental areas of the regenerator through which flow the high pressure gases from the compressor before they are conducted to the combustion chamber.

A shoe formed as a thin flexible layer of hard material having low thermal conductivity and heat-resistant properties is secured to the side of the seal facing the end surface of the matrix, and the tube is reinforced either by internal sheet metal plates or by a recess in the turbine housing within which the tube is mounted. The tube interior is pressurized by a coolant fluid, means being provided for conducting the fluid continuously through the tube. The pressure will cause the shoe to engage the rotating matrix, and the seal assembly is sufficiently flexible to achieve a high degree of sealing effect despite great temperature fluctuations and resulting distortions in the spacing between the housing and rotating matrix.

Referring more particularly to the drawings, the seal assembly shown in FIGURES 1, 3 and 4 is generally indicated at 11 and is adapted to be used in conjunction with a rotating matrix type of gas turbine regenerator indicated generally in dot-dash lines at 12. Such regenerators are of cylindrical shape and have a central rotary axis, indicated at 13 in FIGURES 2 and 3, and a circular core 14 composed of small passages 15, seen in FIGURE 4. These passages lead from one end surface 16 of the regenerator to the other end surface 17, as indicated in FIGURE 2, and certain circumferentially spaced segments of the rotating matrix, such as that shown as enclosed by seal 11 in FIGURE 1, are adapted to receive compressed air from the turbine compressor (not shown). The remaining segments of the regenerator are adapted to receive hot gases at relatively low pressure delivered from the turbine, so that core 14 may be heated, thus transmitting the heat to the compressor air. Conventionally, matrix 12 has an outer rim 18, shown in dot-dash lines in FIGURE 3, rim 18 having a relatively heavy section of solid metal and oppositely disposed surfaces 19 and 21 which are flush with surfaces 17 and 16 respectively. A gear 22 is carried by rim 18 and meshes with one or more driving pinions (not shown) for rotating the matrix.

FIGURE 2 shows in schematic fashion a system for pressurizing and cooling a plurality of seals 11. The system is shown in conjunction with two rotary regenerator matrices 12 for use in a gas turbine of the type shown in copending application Serial No. 231,509, filed October 18, 1962, by Jack J. Benson and assigned to the assignee of the present application. This application issued August 31, 1965, as Patent No 3,203,181. It will be understood, however, that the principles of the present invention could be applied to seals in other environments.

Each regenerator 12 could have two segments for receiving compressed air spaced 180° apart, each segment being enclosed by a pair of seals 11 engageable with the opposite end surfaces of the regenerator, each seal of the pair being shaped as shown in FIGURE 1. Thus, while only four seals 11 are visible in FIGURE 2, there would actually be eight seals 11 for the two matrices 12. One seal 11 of each pair would be engageable with the end surfaces 17 and 19 of its matrix facing the air coming from the compressor; this air is indicated by the wavy arrow 23 in FIGURE 2. The other seal of each pair would be in engagement with the other end surfaces 16 and 21 of its matrix and the heated compressed air passing through these seals, indicated by the wavy arrows 24 in FIGURE 2, would be conducted to the turbine combustion chamber.

Seal 11 is adapted to be supported by a stationary turbine housing 25, as seen in FIGURES 3 and 4, adjacent its matrix 12. The form of seal shown in FIGURES 1, 3 and 4 comprises two flexible tubes 26 and 27, each tube being closed upon itself and having the looped segmental shape shown in FIGURE 1. Tubes 26 and 27 are each preferably fabricated of a flexible material such as silicone rubber capable of retaining its physical properties at elevated temperatures, with a sufficiently thin wall thickness to permit ready yielding in response to pressure changes. Other heat-resistant materials such as the synthetic rubber termed Viton may also be used for tubes 26 and 27. For reinforcing purposes, material such as Fiberglas or other heat-resistant tape may be embedded within the walls of tubes 26 and 27, the tape extending spirally through each tube wall; such tapes are indicated at 28 and 29 respectively in FIGURE 4.

A pair of sheet metal strips 31 and 32 are disposed within tubes 26 and 27 respectively, these strips having the same closed shape as the tubes and being provided for reinforcing purposes, as later described. The width of strips 31 and 32 is such that the cross-sectional shape of tubes 26 and 27 is substantially elongated, with some play remaining for movement in a lateral direction. Two coolant conducting stems 33 are provided, these stems extending through the wall of tube 26 in a lateral direction and having flanged inner ends 34 within the tube wall. The two tubes 26 and 27 are secured in back-to-back relation, with one or more apertured portions 35 being provided for connecting the tubes.

A shoe 36 is provided for each seal 11, the shoe having the same looped segmental shape as the seal, as seen in FIGURE 1. Shoe 36 is preferably fabricated of a relatively thin sheet of material having high hardness properties, low thermal conductivity, and the ability to retain its physical characteristics at elevated temperatures. The shoe has a rectangular cross-sectional shape, being sufficiently thin to permit substantial flexibility in the direction of the matrix axis. One material found suitable for this purpose is Pyroceram, manufactured by Corning Glass Works, Corning, New York. Other materials which could be used for shoe 36 are aluminum oxide and zirconium oxide.

Pyroceram is the registered trademark for a family of materials that have been converted into crystalline ceramics from their original glassy state by the use of nucleating agents and heat treatment. A batch of glass containing a suitable nucleating agent is melted and formed into a transparent glass article in accordance with conventional glassmaking techniques. The product is cooled to temperatures inducing precipitation of the nucleating agents. Thereafter the nucleated article is heated to a temperature range in which growth of the nucleated crystals takes place. In the subjoined claims Pyroceram is referred to as glass-ceramic.

The width of shoe 36 is about the same as the width of each sheet metal reinforcing strip 31 or 32, and shoe 36 is glued or otherwise bonded to the outer surface of tube 27, that is, on the side of seal 11 opposite that from which stems 33 extend. The surface of shoe 36 facing matrix 12 is smooth in order to minimize frictional resistance and wear.

The following is a suitable method for manufacturing the seal of the type shown in FIGURES 1, 3 and 4:

Two mandrels are cast having the same looped segmental configuration as the two tubes 26 and 27 and the same cross-sectional shape as the tubes, as seen in FIGURE 4, except for an allowance for strips 31 and 32. A suitable material for such a mandrel is a substance called Ceracast, or other low melting alloy such as a lead-bismuth alloy having a melting point, for example, of about 200° F.

The two sheet metal reinforcing strips 31 and 32 are placed on the faces of the mandrels for tubes 26 and 27 respectively. The flanged tubular stems 33 are set in appropriate holes 37 in sheet metal strip 31 and in recesses in the corresponding mandrel (not shown). Fiberglas tapes 28 and 29 are then wound spirally around both strip and mandrel of each assembly.

Each assembly is then placed in a mold which surrounds it and within which it is centered by pins. Silicone rubber is then injected into the molds, the pins extracted, and the rubber cured at room temperature, the rubber penetrating the tape.

The molds are then opened and holes 35 drilled in the tubes so as to be in matching relation when the tubes are glued together back-to-back as is next done. The mandrels are then heated and poured out from the tubes, the melted mandrel for tube 27 passing through holes 35. Shoe 36 is then glued to tube 27 on the side thereof adjacent sheet metal reinforcing member 32.

When mounting each seal 11, stems 33 may extend through apertures in stationary housing 25, and an asbestos strip 38 is preferably provided between tube 26 and housing 25. Tubes 33 may be connected to a pressurized coolant system as shown schematically in FIGURE 2. In this figure, two cooling jackets 39 and 41 are shown; these jackets may form part of the turbine housing. The inlet of jacket 39 is connected to the outlet of a pump 42 possibly through a pressure regulating device 43. Pump 42 delivers water or other coolant from a source 44 to jacket 39, from where it is led to the inlet stems 33 of seals 11. The outlet stems 33 of seals 11 are connected to low pressure cooling jacket 41 through restrictions 45, so that a pressure in seals 11 is maintained which will provide optimum sealing and frictional characteristics, the enclosed area within the seal as seen in FIGURE 1 being subjected to high pressure and the surrounding area to lower pressure. A drain connection 46 leads from low pressure cooling jacket 41.

In operation, seals 11 will maintain a sealed relationship between housing 25 and each matrix 12, shoes 36 engaging surfaces 16 and 21 of the matrix on one side and surfaces 17 and 19 on the other side. Because of the relative flexibility of the materials comprising the seals, variations in the distance between housing 25 and the facing matrix surfaces will be followed. Such variations could be created by the wide temperature fluctuations of the unit, especially when the matrix becomes heated and relative thermal expansion takes place between the matrix and housing, or when the alternate cooling and heating of the matrix causes it to warp.

The presence of shoe 36, which has a relatively low thermal conductivity, will permit the use of rubber for tubes 26 and 27 without undue heating, the circulation of coolant and the presence of asbestos strip 38 further maintaining a sufficiently low temperature of tubes 26 and 27, with the major temperature gradients occurring in shoe 36 and strip 38. Tube 27 will provide satisfactory support for shoe 36, which, as stated previously, is sufficiently thin to flex in a lateral direction; tube 27 will flex with the shoe and will therefore maintain its supporting relation thereto. Sheet metal reinforcing strips 31 and 32 will retain tubes 26 and 27 in their proper shape despite the outward radial or hoop pressure exerted on them, and strip 32 will function similarly as a reinforcing member for shoe 36.

FIGURE 5 shows a modified form of seal, generally indicated at 101, which differs from that previously described principally in that only a single tube 102 is employed. The tube has a recessed portion 103 facing the high pressure area with a wall 104 adjacent housing 105 and a second wall 106 supporting a shoe 107. A pair of sheet metal reinforcing members 108 and 109 are disposed between recess 103 and walls 104 and 106 respectively. These reinforcing members are narrower than the total cross-sectional width of tube 102 and reinforce the tube against radially outward expansion. A Fiberglas reinforcing strip 110 is spirally embedded in the wall of tube 102, and one or more hollow stems 111 are mounted within wall 104 and extend outwardly therefrom into a coolant passage 112 in housing 105.

The materials and method of manufacture of seal 101 may be similar to those described with respect to seal 11 of the previous embodiment, and coolant will be circulated within tube 102 through a system such as that shown in FIGURE 2. In operation, shoe 107 will engage the matrix surface, and seal 101 will be sufficiently flexible to follow variations in the spacing between the matrix and housing.

FIGURE 6 shows a still further modification of the seal, generally indicated at 201, the seal comprising a tube 202 of oval-shaped cross section disposed within a recess 203 in housing 204. The size of recess 203 is such that opposite portions of tube 202 will be reinforced against movement, and a shoe 205 is glued to the outer portion of the tube which extends into the space between housing 204 and the matrix. A hollow stem 206 is secured to tube 202 and extends into a coolant passage 207 in housing 204, and a Fiberglas reinforcing strip 208 is spirally embedded in tube 202. A second coolant connection (not shown) is preferably provided for the seal.

An advantage of the construction of FIGURE 6 over those previously described is the use of the housing itself to reinforce the rubber tube, thus eliminating the need for sheet metal reinforcing strips. However, the construction shown in FIGURE 6 will generally be capable of less travel in following space variations for a given seal assembly thickness. This modification of the seal will therefore be useful in particular applications where relatively rigid regenerator matrices are involved, and which thus require less movement of the seal during operation.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a seal for disposition between a gas turbine housing and a movable regenerator matrix, a tube fabricated of rubber material capable of retaining its physical characteristics at elevated temperatures, a flexible reinforcing strip embedded in the wall of said tube, means for pressurizing the tube interior, and a matrix-engageable shoe bonded to one side of said tube and having a smooth outwardly facing surface, said shoe being fabricated of a material selected from the group consisting of glass-ceramic, aluminum oxide and zirconium oxide and having high hardness characteristics, low thermal conductivity and the ability to retain its physical properties at elevated temperatures, the cross-sectional shape of said shoe being sufficiently thin as to be capable of deflection in response to the warping of a matrix surface engaged by said shoe, whereby full and complete contact with the matrix surface will be maintained.

2. In a seal for engagement with a flat end surface of a rotatable gas turbine regenerator matrix, a tube of rubber material closed upon itself, the material of said tube being capable of retaining its physical properties at elevated temperatures, a strip of flexible reinforcing material embedded in the wall of said tube, connections for circulating pressurized coolant through said tube, means within said tube for reinforcing the loop formed by said tube against radial expansion due to pressure within the loop, and a shoe bonded to one side of said tube, said shoe having the same shape as the loop formed by said tube, the shoe being fabricated of material having low thermal conductivity, high hardness and the capability of retaining its physical properties at elevated temperatures, the shoe having a smooth surface facing away from said tube, the cross-sectional shape of said shoe being sufficiently thin in a direction at right angles to said surface as to permit flexing of said shoe sufficient to maintain full engagement with a matrix surface warped by operation at elevated temperatures.

3. In a seal for engagement with a flat end surface of a rotatable gas turbine regenerator matrix, a tube of rubber material formed into a closed loop, the material of said tube being capable of retaining its physical properties at elevated temperatures, a sheet metal reinforcing strip within said tube and having the configuration of said loop, and a shoe bonded to one side wall of said tube and having the same configuration as said loop, the shoe being fabricated of a material having low thermal conductivity and high hardness, the outer surface of said shoe being smooth, the shoe being capable of retaining its physical properties at elevated temperatures, the cross-sectional shape of said shoe being sufficiently thin as to permit its flexing when engaging a matrix which warps due to operation at elevated temperatures.

4. The combination according to claim 3, further provided with a connection on the side of said seal opposite that carrying said shoe for pressurizing the interior of said tube.

5. The combination according to claim 3, further provided with two spaced connections for circulating pressurized coolant through the tube interior.

6. In a seal for use in conjunction with a gas turbine regenerator matrix, a pair of tubes of rubber material having continuous portions of their surfaces bonded together, said tubes forming two closed loops in registry with each other, reinforcing strips of flexible material embedded in said tubes, the material of said tubes being capable of retaining its physical properties at elevated temperatures, a connecting passageway extending through the bonded surfaces of said tubes, a pair of sheet metal reinforcing strips in said tubes having the same configuration as said loops, a pressurizing connection leading from the exposed portion of one of said tubes, and a shoe bonded to the exposed portion of the other of said tubes, said shoe being fabricated of a material having high hardness, low thermal conductivity and the ability to retain its physical properties at elevated temperatures, the shoe having a smooth outer surface engageable with the flat end surface of a rotatable matrix, the thickness of said shoe at right angles to said surface being sufficiently thin as to permit flexing of the shoe so as to maintain full engagement with the matrix when the latter is warped due to operation at elevated temperatures.

7. In a seal for use in conjunction with a rotatable gas turbine regenerator matrix, a tube of rubber material formed as a closed loop, the material having the capability of retaining its physical properties at elevated temperatures, a gas turbine housing having a surface with a groove of the same shape as said loop, said groove facing the flat end surface of a regenerator matrix, said tube being disposed within said groove, the groove being of such a depth that the tube extends partially therefrom toward said regenerator matrix, means for circulating a pressurized coolant through said tube, and a shoe bonded to the outer surface of said tube, said shoe being fabricated of material selected from the group consisting of glass-ceramic, aluminum oxide and zirconium oxide and having high hardness, low thermal conductivity and the ability to retain its physical properties at elevated temperatures, the outer surface of said shoe being smooth and engageable with the flat end surface of said matrix, said shoe being sufficiently thin in a direction at right angles to said surface as to be capable of maintaining full contact with said matrix despite warping of the matrix when operating at elevated temperatures.

References Cited by the Examiner

UNITED STATES PATENTS

| | | | |
|---|---|---|---|
| 2,576,673 | 11/1951 | Cole | 277—34 |
| 2,953,399 | 9/1960 | Weaver et al. | 277—227 |
| 2,969,644 | 1/1961 | Williams et al. | 277—34 X |
| 3,007,518 | 11/1961 | Simpson | 277—34 X |
| 3,178,779 | 4/1965 | Clark et al. | 277—34 X |

SAMUEL ROTHBERG, *Primary Examiner.*

LAVERNE D. GEIGER, *Examiner.*